(12) United States Patent
Chen

(10) Patent No.: US 8,079,023 B2
(45) Date of Patent: Dec. 13, 2011

(54) TYPED INTERMEDIATE LANGUAGE SUPPORT FOR EXISTING COMPILERS

(75) Inventor: Juan Chen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1300 days.

(21) Appl. No.: 11/726,438

(22) Filed: Mar. 22, 2007

(65) Prior Publication Data
US 2008/0235675 A1 Sep. 25, 2008

(51) Int. Cl.
*G06F 9/44* (2006.01)
(52) U.S. Cl. ......... 717/140; 717/139; 717/146; 717/148
(58) Field of Classification Search .................. None
See application file for complete search history.

(56) References Cited

U.S. PATENT DOCUMENTS

| | | | | |
|---|---|---|---|---|
| 4,989,132 A | * | 1/1991 | Mellender et al. | 717/139 |
| 5,339,419 A | | 8/1994 | Chan et al. | |
| 5,355,494 A | | 10/1994 | Sistare et al. | |
| 5,606,697 A | | 2/1997 | Ono | |
| 5,761,511 A | * | 6/1998 | Gibbons et al. | 717/122 |
| 5,836,014 A | | 11/1998 | Faiman, Jr. | |
| 5,848,236 A | * | 12/1998 | Dearth et al. | 714/33 |
| 6,175,956 B1 | * | 1/2001 | Hicks et al. | 717/114 |
| 6,233,732 B1 | | 5/2001 | Matsuyama et al. | |
| 6,314,559 B1 | * | 11/2001 | Sollich | 717/111 |
| 6,804,686 B1 | * | 10/2004 | Stone et al. | 1/1 |
| 6,851,108 B1 | | 2/2005 | Syme et al. | |
| 7,032,021 B1 | * | 4/2006 | Froeschl et al. | 709/224 |
| 7,086,041 B2 | * | 8/2006 | Plesko et al. | 717/141 |
| 7,117,488 B1 | * | 10/2006 | Franz et al. | 717/144 |
| 7,184,917 B2 | * | 2/2007 | Pramanick et al. | 702/120 |
| 7,185,003 B2 | * | 2/2007 | Bayliss et al. | 1/1 |
| 7,512,938 B2 | * | 3/2009 | Tarditi et al. | 717/146 |
| 7,627,862 B2 | * | 12/2009 | Chen | 717/146 |
| 7,685,581 B2 | * | 3/2010 | Plesko et al. | 717/146 |
| 7,788,652 B2 | * | 8/2010 | Plesko et al. | 717/146 |
| 2002/0138819 A1 | * | 9/2002 | Hills | 717/114 |
| 2003/0070006 A1 | * | 4/2003 | Nadler et al. | 709/330 |
| 2003/0084325 A1 | * | 5/2003 | Koved et al. | 713/200 |
| 2004/0073893 A1 | | 4/2004 | Rajaram et al. | |
| 2004/0098374 A1 | * | 5/2004 | Bayliss et al. | 707/3 |
| 2004/0172614 A1 | * | 9/2004 | Gallagher | 717/108 |
| 2004/0268328 A1 | * | 12/2004 | Plesko et al. | 717/141 |
| 2005/0015673 A1 | | 1/2005 | Plesko et al. | |
| 2005/0022087 A1 | * | 1/2005 | Pramanick et al. | 714/742 |
| 2006/0158354 A1 | | 7/2006 | Aberg et al. | |
| 2006/0212847 A1 | * | 9/2006 | Tarditi et al. | 717/117 |
| 2006/0212861 A1 | | 9/2006 | Tarditi, Jr. et al. | |

(Continued)

OTHER PUBLICATIONS

Title: Type Elaboration and Subtype Completion for Java Bytecde, author: Knoblock et al, dated: Nov. 23, 1999.*

(Continued)

*Primary Examiner* — Chameli Das
(74) *Attorney, Agent, or Firm* — Gonzalez, Saggio & Harlan LLP

(57) ABSTRACT

Described is a technology by which a compiler's intermediate representation is generated in a way that includes type checking to ensure safe execution. Typed representation of virtual method invocation uses an exact class name to represent objects of the class but not those of the subclasses, and a combined class type as an encoding of an existential type to represent objects of the class and subclasses of the class. Typed representation of interface method invocation is also provided, as is testing whether the object can be cast to a class, to an interface and/or to a class vector. Vector store checking is also able to be type checked. The medium-level intermediate representation is translated into a low-level intermediate representation, including choosing data representation for types, and converting medium-level intermediate representation operators into instructions in the low-level representation. Using a typed intermediate representation without scopes and determining the scopes of type variables when performing type checking is also described.

20 Claims, 6 Drawing Sheets

U.S. PATENT DOCUMENTS

2007/0169040 A1* 7/2007 Chen .......................... 717/146

OTHER PUBLICATIONS

Reppy, John, "Type-sensitive Control-flow Analysis", Date: Sep. 16, 2006; http://people.cs.uchicago.edu/~jhr/papers/2006/ml-typed-cfa.pdf.

Shao, et al., "Implementing typed intermediate languages", Date: 1998, pp. 313-323, ACM Press, New York, USA, http://portal.acm.org/citation.cfm?id=289423.289460.

Vink, Gerard, "Trends and requirements in compiler technology for embedded cores", Date: Jun. 2005, http://www.tasking.com/technology/ecejun05p32.pdf.

* cited by examiner

TYPED INTERMEDIATE LANGUAGE SUPPORT FOR EXISTING COMPILERS

BACKGROUND

Compilers transform programs from high-level programming languages to machine code by a series of steps. At each stage in compilation, an intermediate language can be defined to represent programs at that stage. At each new stage, the corresponding intermediate language representation exposes more details of the computation than the previous stage up to the point where machine code is reached.

In general, a typed programming language means that its data types (e.g., integers, floats and so forth) have certain restrictions on their usage. Type checking with respect to compilers refers to ensuring at compile time that these restrictions are not violated. Typed intermediate languages thus allow intermediate program representations to be type checked, that is, that the output of a compiler provides a program that is safe to run, and thus typed intermediate languages are used to build more reliable and secure systems.

However, prior implementations of typed intermediate languages in compilers for object-oriented languages do not handle low-level implementation details such as virtual method tables, or do not model standard compilation techniques. Further, none of the prior systems have been shown to scale to compile large programs.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a compiler's intermediate representation is generated in a way that includes type checking to ensure safe execution. Typed representation of virtual method invocation uses an exact class name to represent objects of the class but not those of the subclasses, and an existential type to represent objects of the class and subclasses of the class, and is accomplished by opening the object, providing a new type variable to indicate the object's dynamic type, obtaining a virtual table for the object, fetching the method out of the virtual table, and calling the method on the opened object.

Typed representation of interface method invocation of an interface method on an object is accomplished by opening the object, providing a new type variable to indicate the object's dynamic type, getting a tag of the target interface, searching in the object the method table for the interface, fetching the method out of the method table, and calling the method on the opened object. Another aspect is directed towards testing object type casting, e.g., whether the object can be cast to a class, whether an object can be cast to an interface, and/or whether the object can be cast to a class vector. Vector store checking is also able to be type checked.

Another aspect is directed towards translating the medium-level intermediate representation into a low-level intermediate representation, including choosing data representation for types, and converting operators in the medium-level intermediate representation into instructions in the low-level representation. Another aspect is using a typed intermediate representation without scopes and determining the scopes of type variables when performing type checking, e.g., during type checking a new type variable is introduced each time an object is opened and the new type variable is in scope in the operations that the open operation dominates.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards adding support for a typed intermediate language into an existing example compiler, as a new medium-level intermediate representation, referred to herein as MIR_C. As will be understood, the typed intermediate language uses type encodings to fit new types into a compiler's existing type hierarchy as much as possible to minimize the impact on existing code. Further, there is described flow-sensitive type checking, which deals with the scoping of type variables so that compiler optimizations do not need to be aware of type variable scopes, and the handling of virtual method tables.

While the various aspects described herein are exemplified with an existing type of optimizing compiler that has a high-level intermediate representation, a medium-level intermediate representation, and a low-level intermediate representation, it will be readily appreciated that other compilers may have additional levels, yet may benefit from the technology described herein. Examples of compilers that generate similar high-level intermediate representations include Sun Microsystems Inc.'s JAVA bytecode and Microsoft Corporation's Common Intermediate Language (CIL).

Thus, as will be understood, the technology described herein is not limited to any type of compiler or intermediate language structuring. As such, the present invention is not limited to any particular embodiments, aspects, concepts, protocols, structures, functionalities or examples described herein. Rather, any of the embodiments, aspects, concepts, protocols, structures, functionalities or examples described herein are non-limiting, and the present invention may be used various ways that provide benefits and advantages in using typed intermediate representations in compilers for object-oriented languages.

Figure 1:
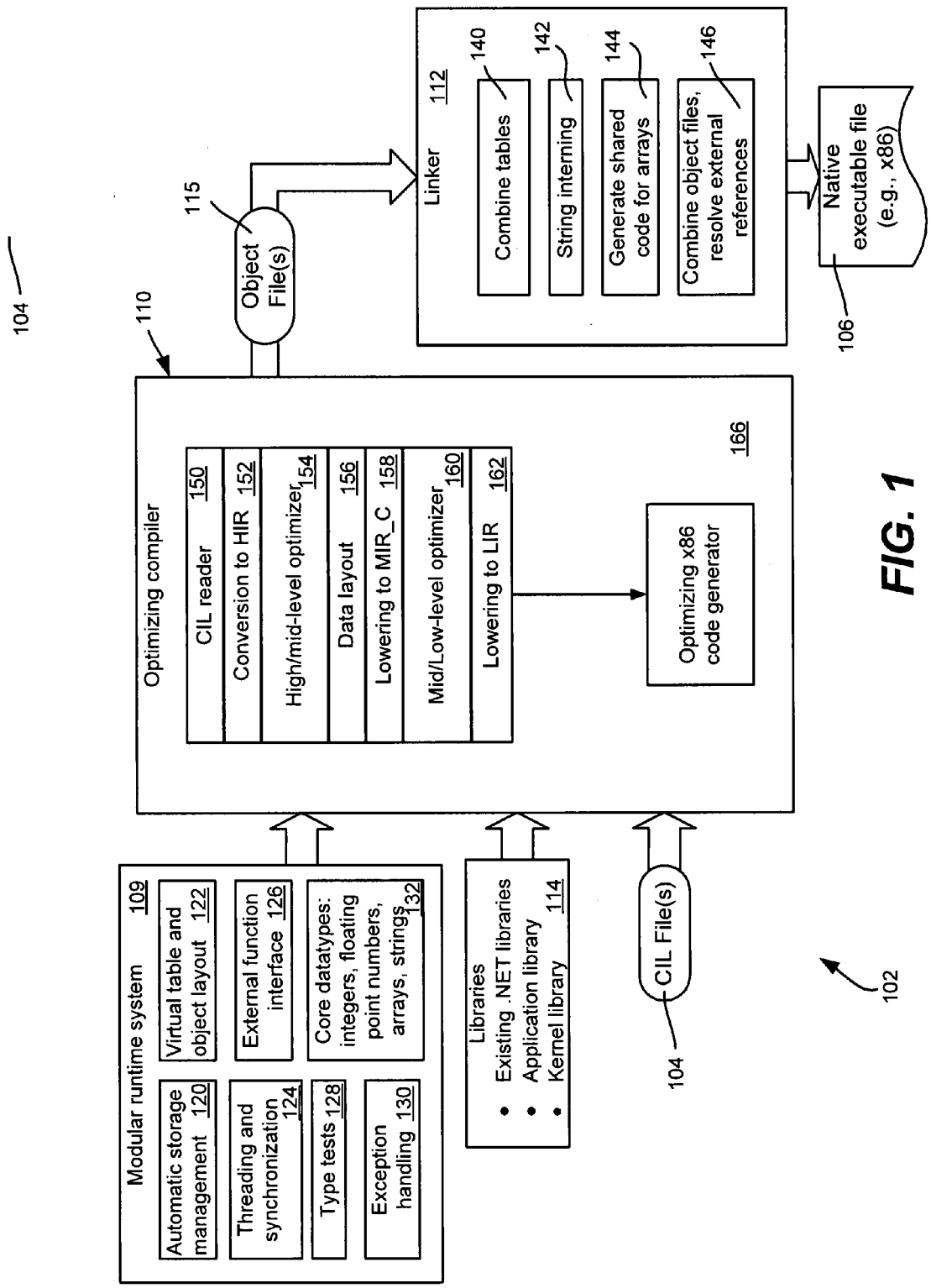
FIG. 1 is an illustrative example of a compiler environment including an optimizing compiler having an extended middle intermediate representation that performs type checking based on a typed intermediate language.

Turning to FIG. 1, there is shown an example compiler architecture 102 that translates Microsoft® Common Intermediate Language (CIL) files 104 to x86 code 106. To this end, as represented in FIG. 1, the example compiler architecture 102 includes a modular lightweight runtime system 109, an ahead-of-time optimizing compiler 110, a linker 112, and a set of libraries 114 built in conjunction with the runtime system 109. Note that in one example implementation, the runtime system 109, the compiler 110, and libraries 114 are written almost entirely in C#.

The example optimizing compiler 110 allows the use of managed languages like C# for general-purpose programming, and works with its own modular runtime system 109 that can be specialized to particular domains. One such example compiler 110 supports most CIL features, except that it has only limited support for reflection, and is written with about 280,000 lines of code, almost all in C#.

Figure 2:
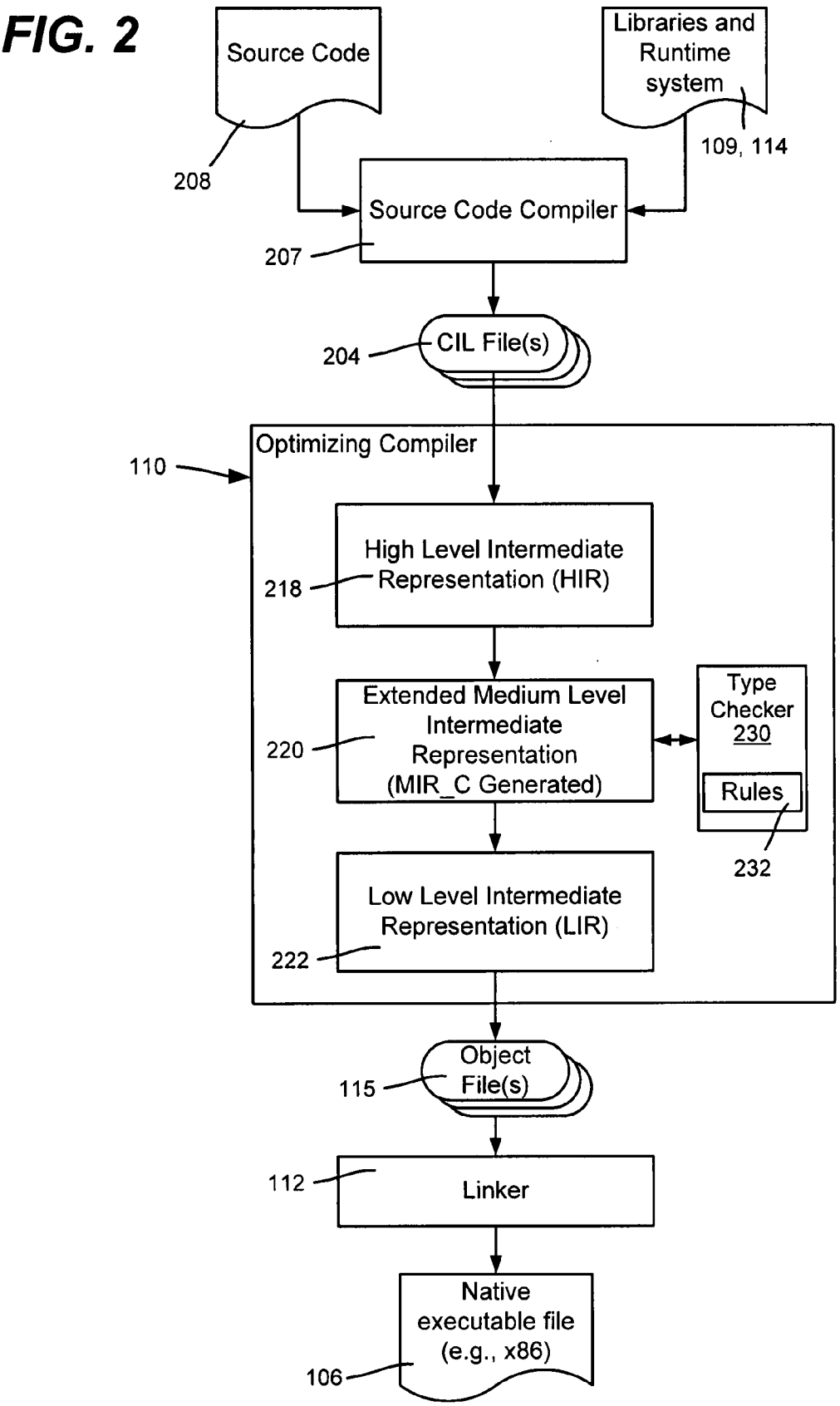
FIG. 2 is a block diagram representing a compiling process through example components of a compiler having an extended middle intermediate representation based on a typed intermediate language.

In general, the optimizing compiler 110 inputs from one or more common intermediate language files 104 (compiled from source code, the runtime system 109, and the libraries 114 by a source compiler 207, FIG. 2), and provides x86 code as object files 115 to the linker 112. The exemplified modular runtime system 109 includes modules and data structures related to automatic storage management 120, virtual table and object layout 122, threading and synchronization 124, an external function interface 126, type tests 128, exception handling 130, and core datatypes 132, e.g., integers, floating point numbers, arrays, strings and so forth. The linker 112 includes modules and data structures related to combining GC and exception tables 140, string interning 142, generating shared code for arrays 144, and to combine object files and resolve external references 146.

The optimizing compiler 110 includes a CIL reader module 150, a module 152 for converting the CIL to a high-level intermediate representation (HIR), a high/mid level optimizer 154, and a module 156 that chooses data layout. Code 158 for lowering the high-level intermediate representation to a medium-level intermediate representation (MIR_C), described below, is provided. Mid/low level optimizer functionality 160 is also provided, along with code 162 for lowering the medium-level intermediate representation to a low-level intermediate representation (LIR). Each representation thus may have extensive optimizations. An x86 code generator 166 is also provided to generate object files from the LIR. The linker 112 links the object files to produce a standard native x86 executable.

As part of the compilation, a typed intermediate language with some type information is provided, as generally described in U.S. Patent Application Publications 2006/0212847 and 2006/0212861, assigned to the assignee of the present invention and hereby incorporated by reference. More particularly, as represented in FIG. 2, various aspects are generally directed towards a typed intermediate representation 220 (below a high-level typed representation 218) for object-oriented languages and a type checker 230 for such a typed intermediate representation, respectively. Thus, both HIR 218 and MIR_C 220 are typed (LIR 222 is not).

To this end, FIG. 2 shows an example process of compiling a program. First, the program code 208, a runtime system 109, and libraries 114 are compiled by the source compiler 207 to Common Intermediate Language (CIL) binaries 104. CIL is a machine-independent byte code format for representing programs in Microsoft's.NET framework. The pre-compiled libraries (distributed with Microsoft's.NET framework) can also be used by the optimizing compiler 110. The optimizing compiler 110 takes one or more CIL binaries 104 and compiles them to native object files 115, e.g., which use standard operating system formats. The linker 112 then links the object files 115 to produce the standard native executable 106.

In general, the typed intermediate representation 220 retains name-based information related to classes from the source code representation. As a result, instead of discarding type information at this level, the optimizing compiler 110 applies typing rules 232 to the parts of the intermediate representation 220 that are typed, based on name-based types and corresponding structure-based record types.

More particularly, the type checker 230 performs type check analysis of the typed intermediate representation 220. The type check analysis performed by the type checker 230 is according to the type checking rules 232 that are applied to the typed intermediate representation 220. The result of the type checking analysis may be expressed as a type check report or the like, (and/or throwing an exception) which may provide an answer if any portions of code in the intermediate representation 220 have violated one or more typing rules 232. The rules 232 are in part expressed in the form of constructs in a typed intermediate language that preserves the notions of class names and class hierarchies declared in the source code representation 208.

The compiler 110 can compile each binary individually or it can compile them all as a whole program. In either case, the compiler 110 performs optimizations, although it is typically able to do more optimization in the whole program case.

Alternatively, after an initial compilation from the original source code representation 208 to an intermediate representation 220, the compiler optimization processes 154, 160 (FIG. 1) can be applied to the intermediate representation 220 to further streamline the original source code 208 according to particular target architectures, for instance. Applying the optimizations 154, 160 results in an optimized form of the intermediate representation 220, which too can be type checked by the type checker 230. In any event, optimizations may be, but are not required to be, applied to the intermediate representation 220 prior to type checking.

Note that FIG. 1 shows a single intermediate representation 220. In other alternatives, it is possible to have more than one intermediate representation. However, the principles of the typed intermediate representation described herein may be applied to any number of such intermediate representations (e.g., 220 in FIG. 2).

By type-preserving compilation, the compiler 110 can type check the result generated thereby, and thus move what are often large and complicated compilers out of the trusted computing base. Also, types may be used to debug such compilers, guide optimizations, and to help generate safety proofs of native code.

Note that realistic compilers such as that similar to the compiler of FIG. 1 (but prior to extending with MIR_C 220) rarely use typed intermediate languages or typed assembly languages, despite various benefits. Instead, such compilers throw away type information at early stages, generally because it was heretofore believed costly to adopt typed intermediate languages, especially in existing compilers, as compilation time and code size in a compiler with a typed intermediate language can easily be several times of those with an untyped intermediate language. Also, changing existing compilation phases around the intermediate language was heretofore believed to require substantial coding and debugging work.

However, as described herein, implementing a typed intermediate language in a realistic, existing compiler such as the compiler 110 is not as expensive as widely believed, provided that the compiler 110 already has some type information and that the typed intermediate language is properly designed. In one aspect, examples directed towards the design and the implementation of a typed intermediate language for object-oriented languages in an existing compiler are described herein, in which only relatively minor overhead is incurred in the cost of the typed intermediate language, e.g., with respect to memory footprint, code size, compilation time, quality of generated code, and how much existing code in the compiler needs to be changed.

Turning to the aspects of intermediate representations, as shown in FIG. 2, the compiler translates Microsoft CIL 104 to HIR 218 and then to MIR_C 220, performs optimizations on MIR_C 220, translates MIR_C 220 to the untyped LIR 222, and generates x86 code (the object files 115) from LIR 222. The implementation of MIR_C 220 requires minor code changes relative to other, conventional MIR. For example, in one example implementation, relative to the prior optimizing compiler, changes occur in performing the translation from HIR to MIR_C, by altering two (out of sixteen) MIR optimizations, in providing the MIR_C type checker, and in the translation from MIR_C to LIR.

The example compiler's HIR (High-level Intermediate Representation) 218 is similar to Microsoft® CIL 104, except that HIR 218 has a standard abstract-syntax-tree like format, instead of a stack-based format. Example HIR syntax is shown as follows:

```
type       ::= class | interface | array(type)| scalarType | structType |
               functionType | ...
binaryOp   ::= arithmeticOp | comparisonOp
operator   ::= Id | binaryOp | LoadStoreOp | Cast| NewObject | CallOp |
               arrayOp | ssaOp | ..
operand    ::= var | constant | address
inst       ::= var = operator(operand, . . . , operand)
control    ::= Jump | Return(operand) | Throw(operand)| If (operand) |
               Switch(operand)
basicblock ::= inst, . . . , inst, control
mdecl      ::= m(var, Idots, var) : type
               {basicblock, . . . , basicblock}
```

HIR types are very similar to CIL (or JAVA, C#) types. Each instruction is of the format "lhs=operator (operands)" where the left hand side (lhs) is a variable and each operand is either a variable, a constant, or an address. The left hand side may be null. Each part of an instruction, e.g., lhs, operator, and operands, is typed. Each CIL operator is translated to a corresponding HIR operator, and the translation from CIL to HIR is thus straightforward. Many high-level operations are treated as primitives in HIR, as in CIL, for example, type cast, virtual method invocation, interface method invocation, and so forth.

In HIR 218, a method contains a collection of basic blocks. Each basic block records its predecessors and successors, and the body of each block comprises a stream of instructions and ends with a control. Type checking is thus local and simple, as the local variables of a method are considered in the scope of the whole method body, and they never change types. The checker checks each basic block in a method by checking the consistency of the operator type and the operand types for each instruction in the basic block. No scope notion is necessary, and therefore no environment needs to track variable types during type checking. Type checking can be done on each instruction without referring to other parties.

The compiler may perform extensive optimizations at the HIR level, including object-oriented optimizations such as devirtualization and standard scalar optimizations such as copy propagation.

The scalar optimizations on HIR 218 are also performed on MIR_C 220, as generally described below. The example compiler's LIR is mostly untyped, and is very similar to abstract machine instructions. Thus, overall, high-level primitives in HIR 218 are lowered to LIR 222 instruction sequences, with each LIR instruction (almost) mapped to a machine instruction.

In the optimizing compiler MIR (Medium-level Intermediate Representation) can be seen as a subset of HIR, in the sense that certain HIR operators are lowered to calling runtime facility functions, such as type cast, size of, and so forth. Therefore, such operators no longer exist in the example prior MIR. Note that the runtime facility functions are written in C# with unsafe features. The prior MIR type system is not expressive enough to represent those functions, let alone to type check them.

An exemplified typed intermediate language described herein is MIR_C 220, (replacing a prior example optimizing compiler's MIR, primarily by extending it). MIR_C is based on two intermediate lightweight base languages, $LIL_C$ and $LIL_{CI}$, however as will be understood, MIR_C better fits the compiler 110 than $LIL_C$ and $LIL_{CI}$. Such lightweight languages preserve lightweight notions of classes and objects, and preserving such object-oriented notions makes MIR_C useful in compiling the MIR 220, which uses classes and objects, (in contrast to other class and object encodings that compile those notions away). As described below, features of MIR_C include encoding of existential types, dealing with scopes of type variables, and mixing flow-sensitive and flow-insensitive type checking.

LILO is a low-level typed intermediate language for compiling core object-oriented language features, such as classes, objects, and arrays. LILc represents standard implementation details of object layout, virtual method invocation, and runtime supports such as type test and array store check. LILc guarantees type safety and memory safety of those implementations. $LIL_{CI}$ extends LILc with support for multiple inheritance via interfaces. LILc and $LIL_{CI}$ preserve notions of classes, objects, and subclassing, unlike conventional class and object encodings that compile those notions to functional idioms (records and functions). The most used high-level typed intermediate languages for object-oriented languages, such as JAVA bytecode and Microsoft CIL, contain the object-oriented notions.

Figure 3:
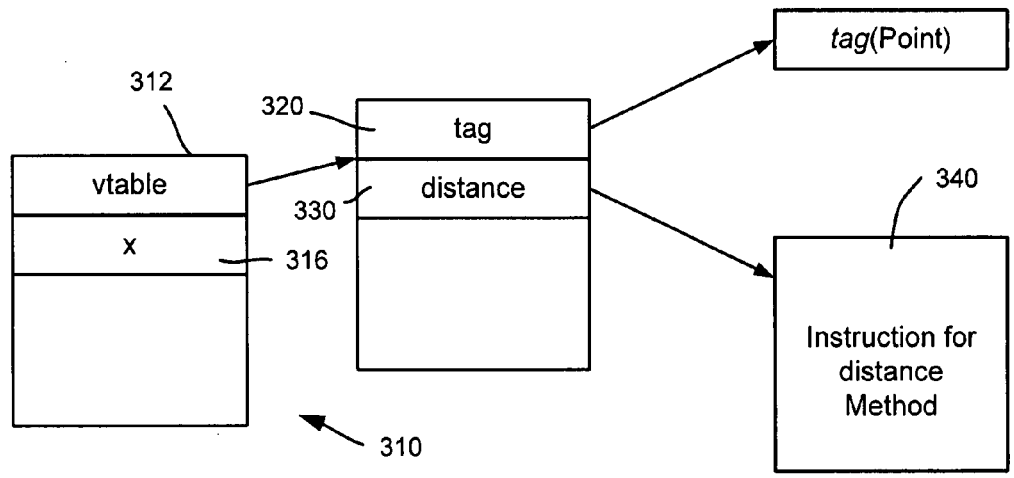
FIG. 3 is a block diagram illustrating an exemplary object layout represented by an exemplary structure-based record type in the typed intermediate representation including data fields and virtual methods.

Nominal (name-based) class names and structural record types coexist in $LIL_C$ and $LIL_{CI}$. Each class C has a corresponding record type R(C) that describes the object layout for the class. For a typical layout strategy, an object contains a vtable and a set of fields. The vtable contains a tag, comprising a unique identifier to identify the class at runtime, and a set of virtual methods. As noted above, classes in a typed intermediate representation are expressed both in terms of their name-based types and structure-based record types. R(C) specifies the layout of an object of "C", including the fields and methods from "C's" super classes. The following example of class Point and its associated record type R(Point) is illustrated as shown in FIG. 3. The source code in an object-oriented programming language for the exemplary class Point is as follows.

```
Class Point {
    int x;
    int distance ( ) {....}}
```

Type R(Point) represents this layout naturally:

```
R(Point) =
    {vtable : {tag : Tag(Point),
        distance : (∃α << Point. α) → int},
    x : int}
```

The tag of a class C identifies C at runtime. Its type is represented as Tag(C), where Tag is an abstract type constructor. For simplicity, tags are treated as abstract in $LIL_C$ and $LIL_{CP}$ however as described below, MIR_C does not treat tags as abstract.

As shown in FIG. 3, in one embodiment, an object layout 310 of class Point contains a vtable 312 of class Point and fields (e.g., of variable "x" at 316). The vtable 312 is a record that includes a runtime tag 320 for the class Point and function pointers for the virtual methods (e.g., the method distance( ) at 330). The function pointer (e.g., 330) points to the appropriate address location of the instructions related to the distance method 340.

Thus, the vtable 312 contains a method pointer for the virtual method "distance" 340, where "distance" takes a parameter referred to as the "this"pointer. The type of the "this" pointer is described below. An object that is an instance of C can be coerced to and from a record of type R(C) without any runtime overhead. The coercions are runtime no-ops. Objects are lightweight because interesting operations are performed on records. Object and class notions are to simplify the type system.

To create an object of class C, a record of R(C) is created, and then the record is coerced to an object. To fetch a field from an object, the object is coerced to a record and the field fetched from the record. To call a method on an object o of class C, the object o is coerced to a record, the vtable fetched from the record, the method fetched from the vtable, and o passed (after coercing to a suitable type) as the "this" pointer to the method. Note that this is how most compilers implement virtual method invocation, if types and coercions are ignored (which can be, as they turn into no-ops at run time).

Figure 4:
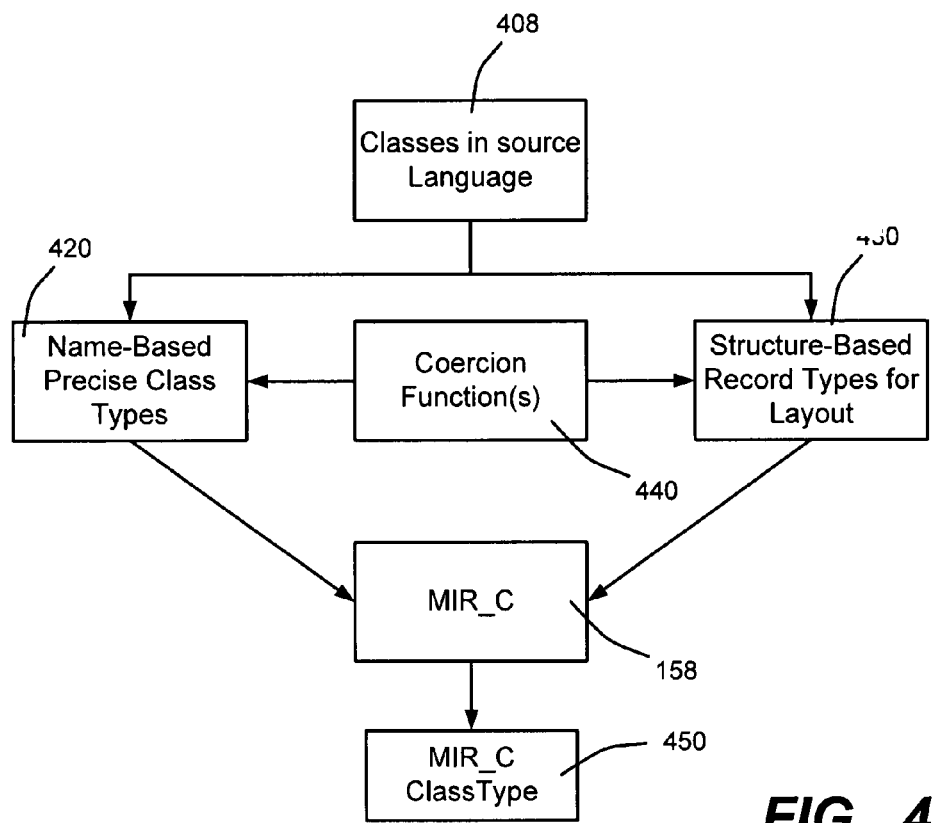
FIG. 4 is a block diagram illustrating name-based class types and structure-based record types in an exemplary intermediate representation.

The separation of the nominal and structural types, represented in FIG. 4, eliminates explicit structural recursion, because the record type R(C) can refer to any class name, including C itself. Also, the separation allows a straightforward typing of self-application semantics, which is a very challenging problem in typed intermediate languages for object-oriented languages. However, as described below, MIR_C 158 views ClassType (e.g., 450) as a combination of class name and record types that describe the object layout of the corresponding classes.

FIG. 4 illustrates a concept of retaining class name-based information for expressing class types in an intermediate representation, which can be expressed independently of the related structure-based record type. In FIG. 4, class types 408 declared originally in a source code language are expressed in the typed intermediate representation 218 (FIG. 2) as a name-based type 420 that precisely refers to objects of the particular class name in the intermediate representation. Each such precise class name in the intermediate representation 218 also has a corresponding structure-based record type 430 for expressing the structure-based information related to the layout associated with the class including its data fields, virtual methods, etc. Coercion functions 440 may be used to coerce between records of the structure-based record type 430 and objects of the name-based type 420. For instance, if a particular data field needs to be accessed, then objects of the name-based type 420 is coerced to records of the corresponding structure-based record type 430 and the data field of interest can be accessed via the record type 430. As described below with reference to FIG. 5, name-based class names and structure-based class types are combined in MIR_C class types.

With self-application semantics, each method has an implicit "this"parameter. To call a method on an object, the object is passed as "this" to the method. Virtual method invocation requires a distinction between the static and the dynamic type of an object. To call a method m on an object o with static type C, o needs to be passed as the "this" pointer to m, or at least an object with the same dynamic type as o. Passing an object with the same static type C may be unsafe. For example, if o is an instance of a subclass of C that overrides the method, and the overridden method accesses fields introduced in the subclass but unavailable in C, then it is unsafe to pass an instance of C to the overridden method.

To guarantee the soundness of virtual method invocation, "exact"notions of classes are provided, e.g., a class name C represents objects of "exact" C, not C's subclasses. To represent objects of C and C's subclasses, an existential type (e.g., $\exists \alpha << C.\alpha$) is used, that is, for objects with static type C, the existential type introduces a type variable a to indicate the runtime type of the object. The dynamic type must be a subclass of the static type C (the symbolic notion "<<" represents subclassing). Source-level type C will be translated to this existential type in $LIL_C$. R(C) describes the layout of objects of exact C. Layouts of those objects whose dynamic types are unknown at compile time are approximated by another record type.

To fetch a field or a method out of an object with type $\exists \alpha << C.\alpha$, the object is first opened, which introduces a fresh type variable for the dynamic type of the object. The type variable is unique, in that each opening introduces a new type variable that is different from any existing one. The "this" pointers of the methods in the object have types referring to the fresh type variable. The "this"pointer has an existential type to allow subclasses to inherit virtual method implementations in super classes. Given the "this" pointer type, the type checker ensures that only objects of the same dynamic type (or its subclasses) can be passed as "this" pointers. This mechanism guarantees the safety of dynamic dispatch.

The following instruction sequence shows how dynamic dispatch is implemented in $LIL_C$. Instruction (1) opens the object o and introduces a type variable β for the dynamic type of o and an alias o' (to the object o) with type β. Instruction (2) coerces o' to a record r (another alias of o). Instruction (3) fetches the vtable out of r and (4) fetches the method m out of the vtable. The typing rules guarantee that the "this" pointer of m has type: $\exists \gamma << \beta.\gamma$, which means objects of class β or its subclasses. Instruction (5) passes o' (after packing to the existential type $\exists \gamma << \beta.\gamma$) to m as "this." The typing rule for a function call requires that only objects of class β or its subclasses be passed to m.

```
//o : ∃α<< C.α
(1) (β,o') = open(o); //o': β
(2) r = toRecord(o');
(3) vt = r.vtable;
```

-continued (4) m = vt.m // "this" : ∃γ<< β.γ
(5) m(pack o' to ∃γ<< β.γ);

With respect to type tests, downward type casts check at run time whether an arbitrary object belongs to some class or its subclasses. In a typical implementation, each class stores a tag in its vtable. If C extends B, then the tag of C has a pointer pointing to the tag of B. The pointers form a tag chain. Downward type casts fetch tags in the chain and compare them with the tag of the target class. This implementation can be expressed as a well-typed function in $LIL_C$ that can be used for arbitrary objects and arbitrary classes. Types are used to connect an object with the tag it contains, and to refine types according to the tag comparison result.

The tag of class C is represented as a constant tag(C), which has type Tag(C). If an object has type τ, then the tag it contains has type Tag(τ). The type checker checks the connection at object creation sites.

Tag comparison is based on that two classes are the same if their tags are equal. If an object o has type τ and the tag in o is equal to tag(C), then τ=C. If one of the parent tags, which identifies a parent class of τ, is equal to tag(C), then τ is a subclass of C and casting o to C succeeds. $LIL_C$ can also express optimizations of the above linear search, such as caching the most recently successful parent tag, or storing some or all parent tags in the vtable.

Source languages such as JAVA and C# have covariant array types, that is, if A is a subtype of B, then Array(A) is a subtype of Array(B). Covariant array types require runtime "store checks" each time an object is stored into an array. If array a has type array(A), to store an object of type A in a, a check is made as to whether the object has the "actual" element type of a because the array a might be an array of B.

$LIL_C$ uses existential types and invariant array types to express source-level array types. $LIL_C$ type ARRAY (B)=∃α<<B. {tag:Tag (α), table: array (∃β<<α.β)} represents source type array(B). The outer existential type binds the "actual" element type (α) of the array, and the inner one binds the "actual" type (β) of each element. The tag identifies the array element type α. The source-level array subtyping is transferred to subtyping on existential types in $LIL_C$. If C is a subclass of B, then ARRAY(C) is a subtype of ARRAY(B).

To store an object in an array, $LIL_C$ programs need to explicitly check whether the object matches the element type of the array. The checks are inserted automatically by the translation from source programs, and can be eliminated if the type system can prove that the elimination is safe. The array store check is essentially testing if an object is of a certain type; it can utilize the type cast function.

Interfaces support a flavor of multiple inheritance where a class or an interface can inherit more than one interface. A typical implementation of interfaces relies on itables (interface tables). The vtable for class C contains an itable that stores information for the interfaces that C implements. Each interface I corresponds to an entry in the itable that contains the tag for I and the method table for I's methods. To call an interface method on an object, the itable is fetched from the vtable, and the target interface searched by comparing the tag of each entry with the tag of the target interface. If there is a match, the desired method can be fetched from the method table at a statically determined offset.

Similar to class names, a source-level interface name I is translated to an $LIL_{CI}$ existential type ∃α<<I.α. To support the above interface implementation, the itable is given a type so that interface method invocation can be type checked.

$LIL_{CI}$ uses array types to represent itables. In the itable for class C, each entry represents a super interface of C. $LIL_{CI}$ uses an existential type that introduces a type variable with lower bound C to abstract each entry. The body of the existential type is a record type containing two fields, namely the tag and the method table for the corresponding super interface.

The type of the method table is unclear, because the content of the table depends on the interface that corresponds to the entry, which may be unknown at compile time. However, during the itable searching process, once there is an entry with the same tag as the target interface, the method table in that entry has to contain the methods of the target interface. $LIL_{CI}$ has two views of method tables, including an abstract view with unknown methods, and a concrete view with known ones. For the abstract view, $LIL_{CI}$ uses type Imty($τ_1$, $τ_2$) for the method table of interface $τ_1$ in class $τ_2$. For the latter, a record type describes the full set of methods. An abstract view of type Imty(I,C) can be coerced to and from a record with the corresponding record type. Again, the coercions are runtime no-ops.

The itable of class C includes an array of element type ∃α<<C. {tag: Tag(α), mtable: Imty(α,C)}. The type variable α hides the actual interface name in each itable entry. For brevity, ITY (τ) is used for ∃α<<τ. {tag: Tag(α), mtable: Imty(α, τ)}.

The translation from the source language to $LIL_{CI}$ creates itables for each class. For each interface I that a class C implements, the translation builds an itable entry and coerces the entry to the desired abstract type. After creating the entries, the translation phase builds an array that contains the itable entries. At interface method invocation time, each entry in the array is fetched and the tag in that entry is compared with the target interface's tag. In case of a match, the abstract method table can be coerced back to the concrete view, which contains all methods of the target interface. The itable search process is described as a polymorphic function in $LIL_{CI}$. Interface cast also searches the itable, similar to interface method invocation. It is represented as another polymorphic function in $LIL_{CI}$.

$LIL_C$ and $LIL_{CI}$ are based on standard polymorphic lambda-calculus, with extensions of classes, interfaces, quantified types with subclassing-bounded type variables, and so forth. A main syntactic category at the term level is expressions. Each method has an expression as the method body. Expressions may contain sub-expressions. Variables are standardly scoped. For example, a let-expression "x:τ=e1 in e2" introduces a local variable x who is in scope of e2. Instructions such as "open" introduce type variables. In expression "(α, x)=open(e1) in e2", α is a new type variable that is in scope of e2.

There are no return expressions because methods implicitly return the value of its main body expression. Conditional branch expressions contain two sub-expressions as the branches. An example is the tag comparison expression "if $EqTag^τ$ (et1, et2) then e1 else e2", which compares tags et1 and et2 and jumps to e1 if the tags are equal or falls through to e2 otherwise.

Type checking $LIL_C$ and $LIL_{CI}$ is mostly standard. A class table Θ contains the declaration for each class in the program. A kind environment Δ tracks type variables in scope. A heap environment Σ maps heap labels (addresses) to their types. A type environment Γ collects the types of local variables in scope and checks if types are consistent. The typing judgment has the following format, Θ; Δ; Σ; Γ⊢e:τ, meaning that under environments Θ, Δ, Σ and Γ, expression e has type τ. When checking an expression, the type checker recursively calls itself to get the types of sub-expressions and then returns the type of the current expression.

$LIL_C$ and $LIL_{CI}$ cannot be used directly to replace MIR in the prior example compiler, although the two languages provide reasonable candidates relative to other class and object encodings. For example, the example compiler does not have record types, type variables, quantified types, and certain operators in $LIL_C$ and $LIL_{CI}$. Further, the example prior compiler uses instruction streams and controls instead of expressions, and has local flow-insensitive type checking. A naive implementation of $LIL_C$ and $LIL_{CI}$ in the prior compiler would require significant changes to the existing code, including the type system, the MIR format, and all MIR optimizations that are currently shared by HIR and MIR.

MIR_C extends the prior MIR, among other things to bridge the gap between the prior compiler, $LIL_C$ and $LIL_{CI}$. MIR_C provides a number of advantages features in its type system, while minimizing changes to the prior compiler's existing code base, yet still preserving the essence of $LIL_C$ and $LIL_{CI}$ so that type checking of the low-level implementations of operations such as virtual method invocation and type cast are provided.

With respect to types, the example HIR uses ClassType to model classes in the source program. Each instance of ClassType represents a class in the source program and contains a table of members of the class, namely fields and methods. HIR does not have record types. The "struct" types in C# are implemented as unboxed classes, where each struct type contains only a pointer to the corresponding "boxed" class type. $LIL_C$ has separated class names and record types that describe the object layout of the corresponding classes.

MIR_C views ClassType as a combination of both a $LIL_C$ class name and the corresponding record type. As a result, MIR_C can reuse ClassType without change, yet still preserve the two views of classes in $LIL_C$. Another benefit to reusing ClassType is that MIR_C does not need to coerce between objects and records, which saves many coercion instructions and makes the code more concise. Note that coercions have no runtime overhead.

HIR does not have type variables. MIR_C introduces type variables (TypeVarClass) for type variables that will be instantiated with classes and interfaces. Type variables in $LIL_C$ and $LIL_{CI}$ are instances of a new class "TypeVarClass".

MIR_C makes TypeVarClass a subclass of ClassType. As a result, an instance of TypeVarClass is regarded as a normal class and contains a table of its members. The member table of a type variable includes those members from the super class of the type variable. The members are added by need to the table to save space. Also, objects whose types are type variables are treated as ordinary objects, from which members can be fetched as in HIR.

As described above, source-level class name C is translated to an existential type $\exists\alpha<<C.\alpha$ in $LIL_C$. MIR_C needs to introduce existential types. Because of the extensive use of objects in HIR whose types are class names, changing the types of those objects to new existential types would impose significant changes to optimizations. MIR_C uses the class name C (an instance of ClassType) as an encoding of $\exists\alpha<<C.\alpha$, and introduces another type ExactClassType to represent objects whose types are exact C. ExactClassType is also a subclass of ClassType, so that exact classes can be used as normal classes. Objects whose types are C in MIR_C can be opened to get type variables with upper bound C, as with normal existential types. Similarly, objects whose types are type variables with upper bound C can be packed to type C. Because TypeVarClass inherits ClassType and instances of ClassType are viewed as encodings of existential type, MIR_C can reuse most optimization code, as described below. MIR_C also has explicit existential types for those that do not have the format $\exists\alpha<<C.\alpha$ and therefore cannot use the encoding mechanism.

The optimizing compiler has explicit implementations of tags (or runtime types). The tag of a class contains a pointer to the corresponding vtable of the class and a pointer to its parent tag if one exists (that is, the class has a super class). HIR has a type for tags of all classes. MIR_C does not treat tags as abstract, (as does $LIL_C$). Further, as described above, MIR_C distinguishes between tags of different classes by their types. MIR_C introduces a class "RuntimeType" to model tags. Each instance of RuntimeType tracks the corresponding class, whereby tags of different classes have different types. RuntimeType also inherits ClassType. Each instance of RuntimeType has two fields in the member table, the vtable pointer and the parent tag pointer. Those two fields can be fetched from tags by standard field fetch.

Similar to tags, the representation HIR 218 gives a common type to vtables of all classes. MIR_C provides a class "VTableType" for vtables. Again, VTableType is a subclass of ClassType. Each instance of VTableType tracks the corresponding types, and contains in the member table a pointer to the tag and a collection of method pointers for the virtual methods. Members are added to the member table by need.

Figure 5:
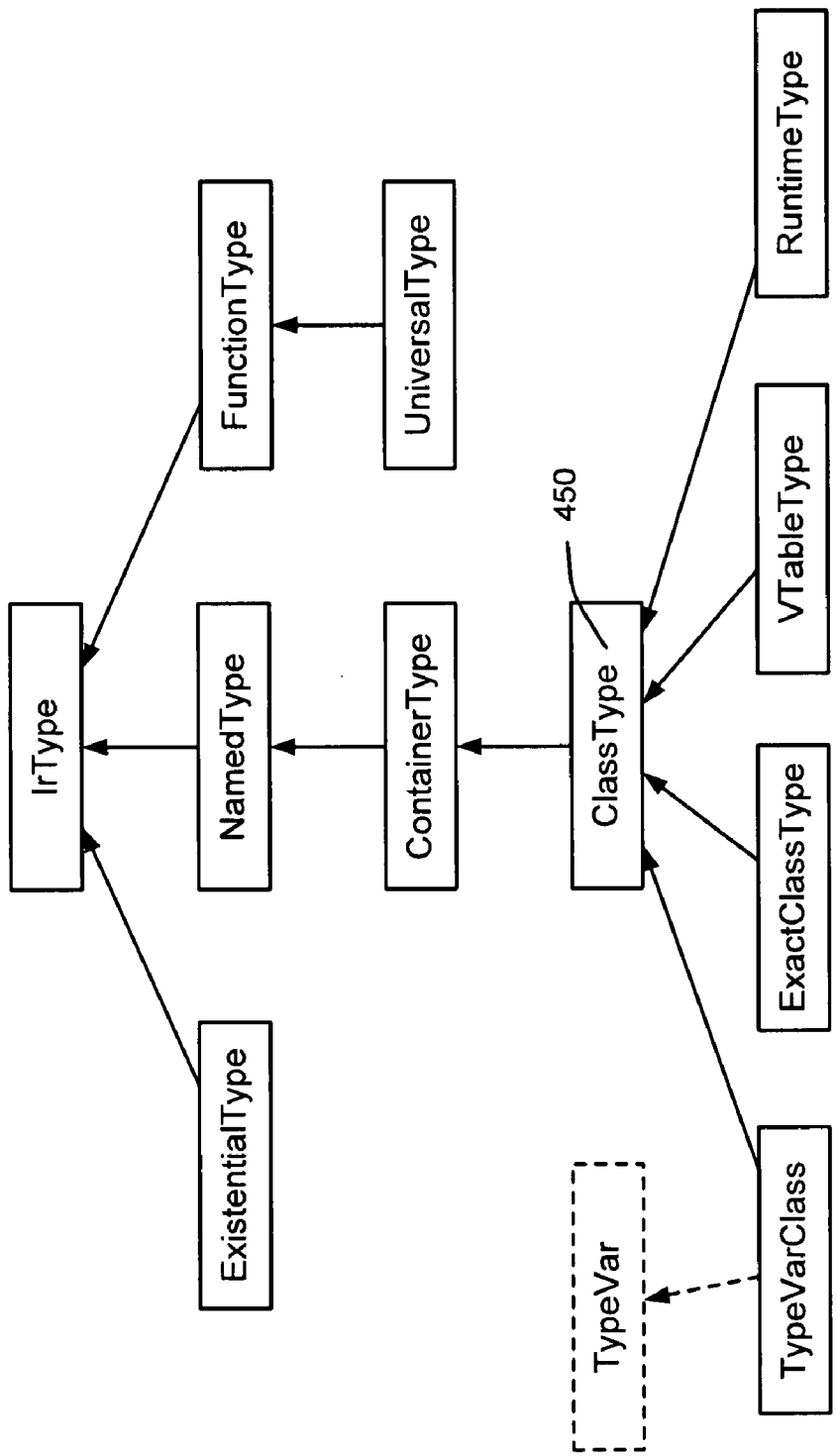
FIG. 5 is a block diagram representative of the class hierarchy of the exemplary intermediate representation.

FIG. 5 shows the class hierarchy for MIR_C types. ExistentialType, UniversalType, TypeVarClass, ExactClassType, VTableType and RuntimeType are newly provided by MIR_C. Others are original HIR types; "IrType" is the root class for all HIR types. ExistentialType is a subclass of IrType, UniversalType is a subclass of function type "FunctionType" because it is used for only polymorphic functions (for example, type cast) at present. "TypeVar" is an interface for type variables (note that the dashed line means an interface implementation). In one example implementation, MIR_C uses only type variables that will be instantiated with class and interface names (instances of "TypeVarClass"). There may be type variables that can be instantiated with any type (even primitive types) in alternative implementation of MIR_C that support generics. The "TypeVar" interface provides for such extensibility.

In HIR, the body of each method is a set of basic blocks, each comprising a set of instructions and ending with a control that transfers control to other basic blocks. The body of a $LIL_C$ function is simply one $LIL_C$ expression. MIR_C uses the format of basic blocks to organize instructions, again to ease the translation from HIR and to minimize the changes on optimizations.

MIR_C reuses most HIR instructions and adds a few more, including "open" which eliminates existential types, and "pack," which introduces existential types. Note that "open" may be applied to objects whose types are class names, and "pack" may return objects whose types are class names, because of the encoding of existential types described above.

MIR_C also includes polymorphic methods and provides a call instruction for those methods. Besides normal value arguments, calling polymorphic methods also needs type arguments to instantiate the type variables of the methods. The instruction records the type arguments passed to polymorphic methods.

MIR_C also provides type refinement on comparing vtables as well as on comparing tags. MIR_C employs two controls for vtable and tag comparisons. Each of the two controls takes two operands (the two values to compare) and the destination to jump to if the two operands are equal. The control falls through to the next basic block if the two operands are unequal. Because the tag representation is explicit in MIR C, the LIL$_C$ instruction for fetching and testing the parent tag of a tag is not a primitive in MIR_C, but is lowered to two instructions, namely fetching the parent tag field from the tag and comparing if the parent tag is null.

One main difficulty in type checking lies in type variables, which identify the dynamic types of objects to guarantee the soundness of dynamic dispatch. Each type variable should be associated with one and only one object. If two variables or two occurrences of the same variable point to different objects, but are assigned the same type variable, the type checker should report an error. However, a static type checker cannot tell if for two variables, the two occurrences of the same variable are pointing to the same or different objects. One solution is to use a fresh type variable for each "open" instruction in the program, but has drawbacks. Thus, to handle type variables, MIR_C uses two sets of type variables, one in the program and the other for type checking. In an "open" instruction "x:α=open(o)", the type variable α gives a type to x that is visible to optimizers. The optimizer can query information about the type of x as normal classes, however the type variable does not need to uniquely identify the dynamic type of o and x. The type checker introduces a fresh type variable for each "open" instruction as the unique identifier. For example, consider that the checker assigns β for the above "open" instruction. The two type variables α and β share the same bounds, but are unrelated otherwise. At merge point of control, the checker merges types if a variable has different types in different incoming edges. This only happens when the type of the variable contains type variables. Therefore, merging types falls into merging type variables as bases. Merging is similar to a union operation. Merging a set of unrelated type variables produces a fresh type variable. The fresh type variable tracks from which type variables it is merged. Merging the fresh type variable with a component results in the fresh type variable itself. Because the type checker needs to track the fresh type variables, the checking process is no longer flow-insensitive, as in HIR. A kind environment collects all type variables introduced so far. A type environment collects the types of all in-scope variables The MIR_C type checking comprises two phases, type inference and type checking. For each basic block, the type inference phase calculates its entry environment, that is, the types of the variables that are live at entry of the basic block. Type inference is done as a normal flow-sensitive analysis. The checker maintains a queue of basic blocks. Initially, only the root block is in the queue, and each basic block has an empty entry environment and an empty exit environment, except that the root block's entry environment is filled with the method parameters. Each time a basic block is dequeued, the checker merges the types of variables in the predecessors' exit environments if necessary to form the new entry environment for the block. If the entry environment has been changed, then the checker calculates the new exit environment by going through each instruction in the basic block in order. The exit environment is changed, the checker enqueues the successors if they are not already in the queue. The process continues until the queue is empty.

The type checking phase is straightforward. Each instruction is checked for type consistency. An instruction may include, for example, an operator, operand, and destination. In one illustrative embodiment, a type of operand is determined and matched with an operator that corresponds to the operand. A type of destination corresponding to the operator and operand is also matched during type checking, in this illustrative example. At each control, the checker checks if the current type environment satisfies the environment of the destination. The checking of the type refinement controls is changed to better fit the MIR_C format. In LIL, when checking the tag comparison instruction if EqTag(tag1, tag2) a then e1 else e2",the checker checks if tag1 has type Tag(a) for a type variable a, if tag2 has type Tag(s) for a type s, and if e1 has type r [s/cr] (which means replacing s with a in r). Because when control transfers to e1, the checker already knows that a and s are the same type, and s is always a class/interface name or another type variable, so the substitution is valid.

In MIR_C, the tag comparison is a control without two explicit expressions as targets. The MIR_C checker maintains a mapping of type substitution for each predecessor-successor basic block pair. When the checker sees a tag comparison control in block B1 and concludes that for successor α=s, it adds the mapping from α to s to the (B1, ) pair. During the type inference phase, when calculating the entry environment for , the mapping is applied to all variable types in the exit environment of B1. For efficiency, MIR_C performs a few straightforward optimizations, including that the entry environment for each basic block contains only variables live at the entry. Also, variables whose types contain no type variables are not tracked in the entry environment. The variables may have primitive types (integers, enums), and never change types. Further, if none of the operands of an instruction is tracked by the type environment, that is, none of the operand types contains type variables, then MIR_C uses the old checker, which saves some coding effort.

Checking which checker to apply to an instruction is straightforward, e.g., if the instruction is among the certain kinds of instructions that requires the new checker and fails the operator consistency test, then the new checker is applied; otherwise the old one is applied. If the types of all local variables of a method contain no type variables, then the checker does not go through the type inference process and falls back to the old flow-insensitive checker.

Turning to an explanation of the implementation of MIR_C, including the translation from HIR to MIR_C and optimizations performed on MIR_C, and the translation from MIR_C to LIR, as described above, MIR_C supports objects, classes, interfaces, and arrays. One current implementation of MIR_C deals with only vector store checks, but it is straightforward to generalize MIR_C to multi-dimensional arrays.

Figure 6:
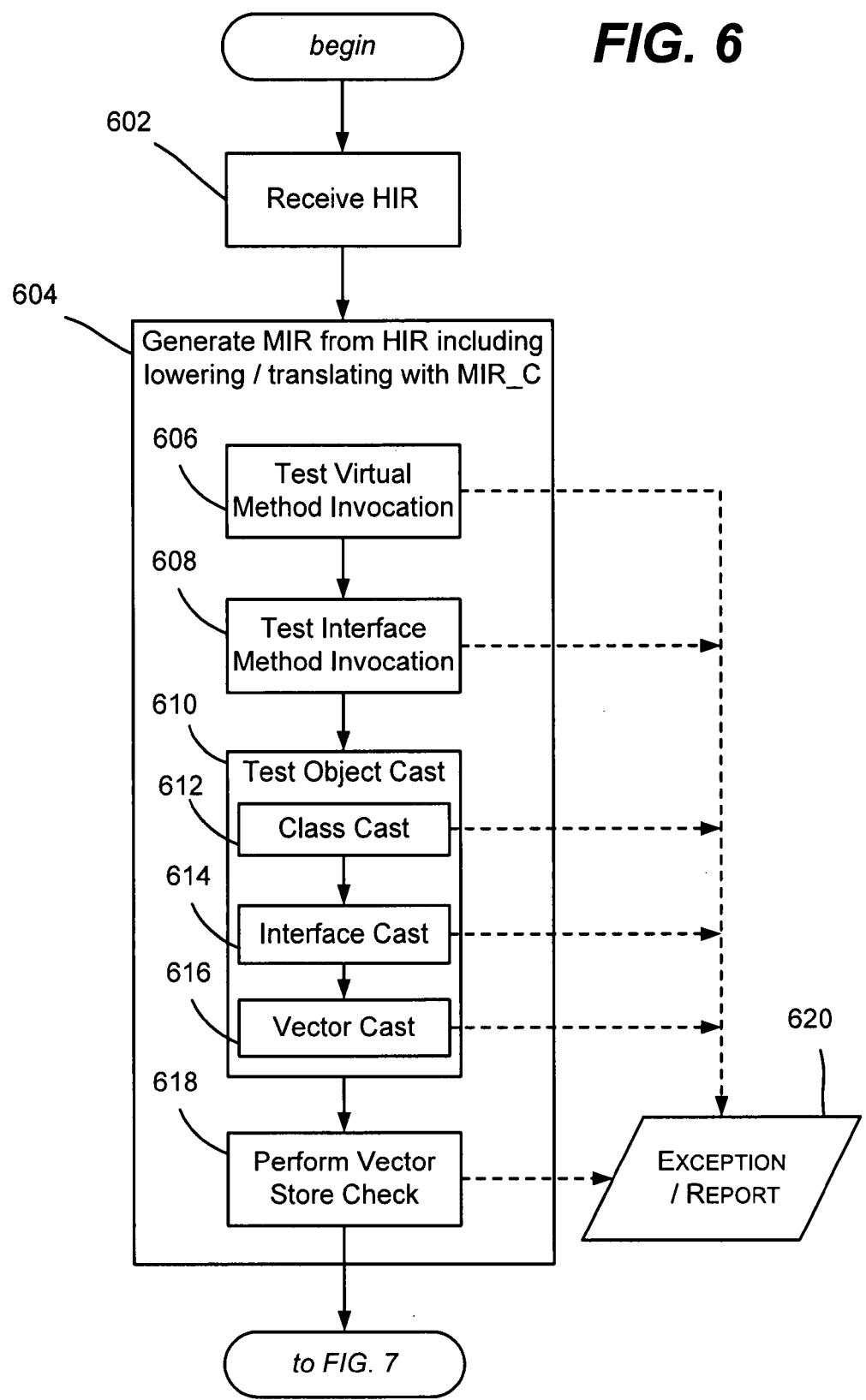
FIG. 6 is a flow diagram representative of example steps in lowering a high-level representation to the intermediate level representation.

FIG. 6 represents an example of the translation from HIR (step 602) to MIR via MIR_C (block 604), which includes lowering of several HIR operators, including virtual method invocation (step 606), interface method invocation (step 608), type cast (step 610) including class cast (step 612), interface cast (step 614) and vector cast (step 616), and vector store check (step 618). Most of the HIR operators are lowered by calling runtime utility functions written in MIR_C. Being written in MIR_C, those utility functions are type checked as normal user functions, and they can be inlined as normal functions and the program can be type checked as a whole. Note that many safe languages have runtime systems written in unsafe languages; the safety of those runtime systems cannot be checked, nor can the integration of safe programs and unsafe runtime systems.

As described above, virtual method invocation (step 606) is implemented in a sequence of MIR_C instructions. Each part of an instruction, e.g., operator, operands, and destination is typed. An example sequence to implement "o.m( )" is as follows:

//o : C
(1) o' : α = open(o);

-continued

```
(2) vt : vtable(α) = o'.vtable;
(3) m : α → void = vt.m;
(4) m(o');
```

For simplicity, only the type of the destination is shown. Because of the encodings of types, MIR_C instructions are less elaborate than $LIL_C$ ones. For example, the object o has type MIR_C type C, which is a shortcut for $LIL_C$ type $\exists \alpha << C.\alpha$. MIR_C omits the coercion from objects to records as described above, because name-based class names and structure-based record types are combined in MIR_C class types. Also, the "this" pointer type in MIR_C is the same as the dynamic type of the object from which the virtual method is fetched, instead of an existential type in $LIL_C$. MIR_C has simpler "this" pointer types because it assumes virtual methods have necessary type coercions when put into vtables.

With respect to implementing interface method invocation (step 608), the example compiler relies on an itable search. The search is implemented as a polymorphic function. For interface look up in MIR_C, the function is polymorphic because it needs to be applied to search any interface method in any object's itable. The function has two type parameters, the target interface and the runtime type of the object. There are also two value parameters, the tag of the target interface and the object. The function returns the method table for the target interface in the itable if the runtime type of the object implements the target interface. Otherwise, an exception is thrown. The invocation of a method m of interface I on an object o is translated to the following sequence:

```
(1) o' α = open(o);
(2) tag : Tag(I) = getTag(I);
(3) mt: Imty(I, α) = InterfaceLookup[I, α](tag, o');
(4) m : α → void = mt.m;
(5) m(o');
```

Instruction (1) first opens the object o and introduces a new type variable α for the dynamic type of o. Instruction (2) gets the tag of the target interface 1. Instruction (3) calls the polymorphic interface look up function "ILookup", with type arguments I and α. The result is a method table for interface I in class α. Instruction (4) then fetches the method m out of the method table. The layout of the method table for interface I is predetermined by the compiler, and is the same for any class in the program. Therefore, m can be found at a fixed offset. Instruction (5) calls m on object o'. Similar to virtual method invocation, the "this" pointer type is the same as the dynamic type of the object, to guarantee the safety of dynamic dispatch.

Testing whether an object can be cast to a class (step 612) is done by a polymorphic function, ClassCast. The function has two type parameters, comprising the target class and the runtime type of the object to cast, and two value parameters, the tag of the target class and the object to cast. ClassCast walks through the tag chain of the object and searches for the tag of the target class. Casting an object o to a class C is translated to the following MIR_C instruction sequence:

```
(1) o' : α = open(o);
(2) tag : Tag(C) = getTag(C);
(3) o'' : C = ClassCast[C, α](tag, o');
```

A polymorphic function, InterfaceCast, (similar to "Class-Cast") tests whether an object can be cast to an interface (step 614). The function also has two type parameters, the target interface and the runtime type of the object to cast, and two value parameters, the tag of the target interface and the object to cast. InterfaceCast searches the itable of the object for the target interface. Casting an object o to an interface I is translated to the following MIR_C instruction sequence:

```
(1) o' : α = open(o);
(2) tag : Tag(C) = getTag(I);
(3) o'': I = InterfaceCast[I, α](tag, o');
```

Another polymorphic function, ClassVectorCast, tests whether an object can be cast to a class vector (step 616). The function has two type parameters, namely the element type of the target vector and the runtime type of the object to cast, and two value parameters comprising the tag of the element type of the target vector type and the object to cast. ClassVectorCast fetches the tag of the element type of the object to cast and tests whether the element type of the object is a subclass of the element type of the target vector type by walking through the tag chain as in "ClassCast". Casting an object o to a vector of class C is translated to the following MIR_C instruction sequence:

```
(1) o' : α = open(o);
(2) tag : Tag(C) = getTag(C);
(3) o'': I = VectorCast[C, α](tag, o');
```

Another polymorphic function, InterfaceVectorCast, tests whether an object can be casted to an interface vector.

Vector store check (step 618) essentially checks whether the runtime type of the object to store is a subclass of the element type of the vector. Vector store check can use the above typecast functions, however which type cast function to call may be determined only at run time, for example, when an object is stored into a vector of System.Object in CIL. The vector can be a class vector, an interface vector, or a vector of vectors. MIR_C relies on reflection to differentiate the three cases. A polymorphic function StoreCheck tests if an object can be stored into a vector. It takes two type parameters, the element type of the vector and the runtime type of the object, and two value parameters, the vector and the object to store. StoreCheck tests certain properties of the element type of the vector to determine which type cast routine to call. StoreCheck cannot be fully type checked by the MIR_C checker because of the reflection. Casting an object o to a vector v is translated to the following MIR_C instruction sequence:

```
(1) v' : α[ ] = open(v);
(2) o' : β = open(o);
(3) o'' : α = VectorStoreCheck[α, β](v', o');
```

Optimizations on the example MIR_C are set forth below. One set is directed towards copy propagation, constant propagation, constant folding, and algebraic simplifications, which are done in a single pass on a per-function basis using symbolic evaluation. Common subexpression elimination is done on a per-function basis using a forward analysis that computes available expressions. It also eliminates redundant field loads, including loads followed by redundant loads, as well as stores followed by redundant loads. Redundant load elimination is important for programs written in object-oriented programming languages where member field access is syntactically identical to variable access.

Dead-code elimination includes the elimination of unreachable code via a reachability analysis of basic blocks in the control-flowgraph, and the elimination of unnecessary statements, which is implemented on functions when they are in SSA form.

Loop-invariant removal takes invariant instructions out of loops to loop pre-header blocks. It operates on functions in SSA form. Reverse copy propagation of temporaries eliminates unnecessary assignments to temporaries. It is a simple per-basic-block optimization. It takes statements of the form t=exp; v=t and replaces them with v=exp.

Optimization of convert instructions cleans up converts introduced by the conversion of CIL code to the compiler's HIR. Most CIL integral operations operate on 32-bit values. CIL also has a stack-based instruction set that uses an evaluation stack whose elements are 32-bits wide. Consequently, values smaller than 32-bits are widened when they are pushed on the stack. Values are narrowed when they are stored from the stack to local variables and memory. These widening and narrowing operations turn into convert instructions in the example compiler's high-level intermediate representation.

The optimization shortens chains of integral conversion operations. It also replaces arithmetic and compares instructions with forms that operate on smaller integers.

Jump chain elimination is provided to eliminate jumps to jump instructions and branches to jump instructions. If code sets a Boolean variable to a constant and then jumps to code that branches on the Boolean variable, the jump can be turned into a direct jump to the appropriate branch case, referred to as short-circuiting. Loop header cloning is another aspect, which turns a while loop into a branch test followed by a do-while loop. This avoids unnecessary conditional branches at the bottom of loops, and also provides a place to where exception-throwing operations in a loop can be safely moved. Inlining is directed to the size of a high-level function being estimated in terms of lowered machine instructions. The estimate is used do two kinds of inlining. A first kind of inlining does not allow any code expansion, which handles the case where a function body is smaller than the overhead of making a call. A second kind of inlining allows moderate code expansion. There is no attempt to estimate the size reduction that may occur from optimizations that are done after a function is inlined at a specific call site. Elimination of unreachable classes, methods, and fields (tree-shaking) is an optimization particularly important for whole program compilation, where the user program, libraries and the runtime system are compiled together. It reduces the size of the program by a significant amount (e.g., sixty-five percent or more) by eliminating unused parts of libraries. This significantly reduces compile time. This optimization uses a type-based instantiation and invocation analysis. The analysis starts at the entry points of the program and transitively computes the fields, methods, and types that may be respectively accessed, called, or constructed. The computation is flow-insensitive and interprocedural. An instance of a class has to be constructed somewhere in the reachable part of a program before its virtual method and instance field members are considered accessible. A method hierarchy analysis is used to compute the set of methods that may be called at a virtual call site. The method hierarchy analysis computes the set of method that may override a virtual function. This is then restricted to the set of methods in instantiated classes.

In one example implementation, only two optimizations are changed, namely common subexpression elimination and treeshaking, which are changed to support the new MIR_C operators and types. Common subexpression elimination needs to index the subexpressions. Treeshaking analyzes the instructions to determine whether types are accessed. The changes to common subexpression elimination and treeshaking are local and straightforward.

The translation from MIR_C to LIR is also straightforward. Translation includes two tasks, generally represented in FIG. 7, namely choosing the data representation for the new MIR_C types (block 702), and lowering the new MIR_C operators to LIR ones (block 720). As shown via steps 704 and 706, data representation type variables share the data representations with their upper subclassing bounds. Vtable types (step 708) and runtime types (step 712) use the data representations of the general vtable type (step 710) and the runtime type (step 714), respectively, in the optimizing compiler. Existential types have the data representations of their bodies (steps 716 and 718).

Figure 7:
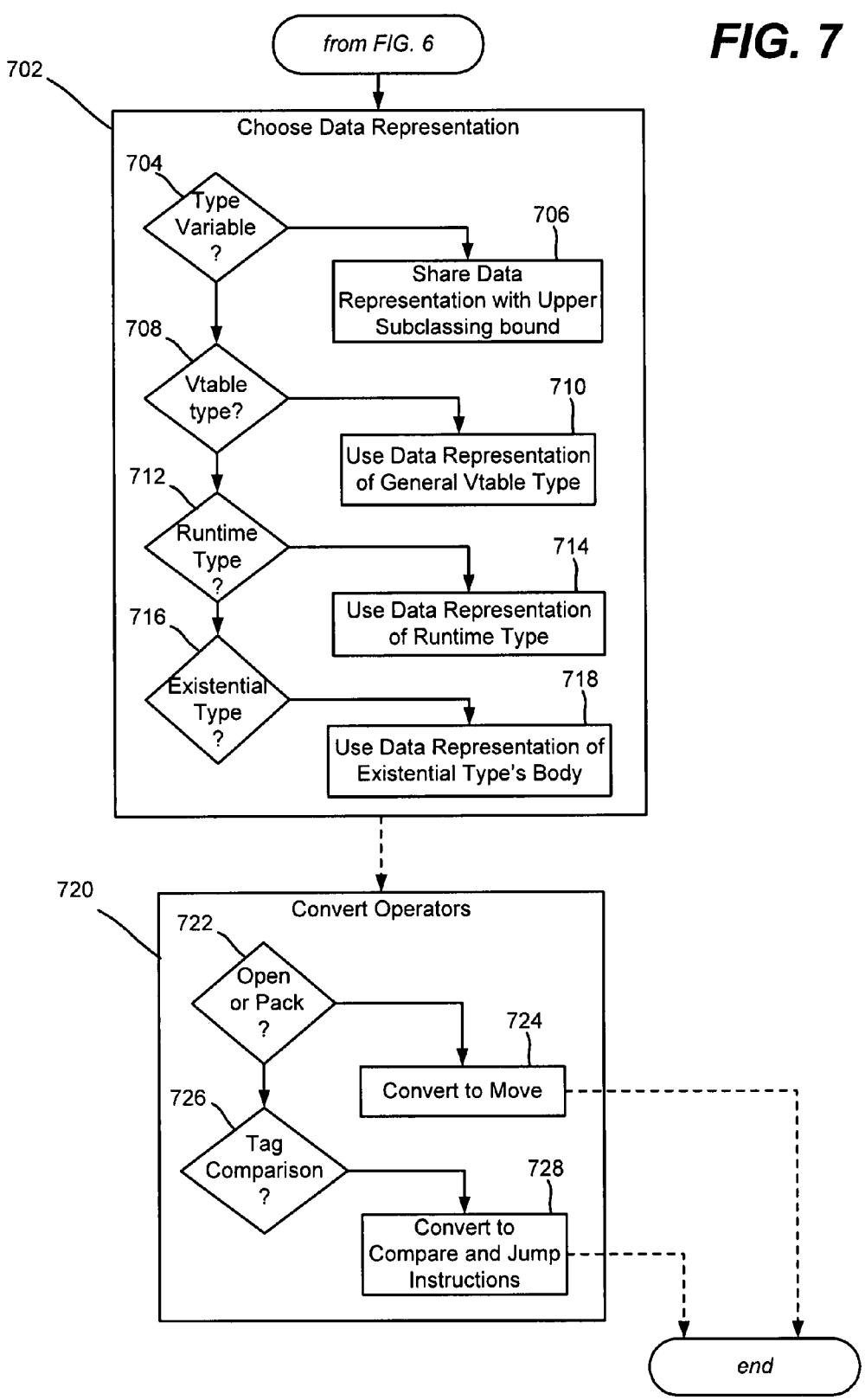
FIG. 7 is a flow diagram representative of example steps in lowering the intermediate level representation to a low-level representation.

To convert the operators (block 720) "open" and "pack" instructions are converted to "move" in LIR, as represented in FIG. 7 by steps 722 and 724. The tag comparison instruction (step 726) is broken into two instructions, compare and jump (step 728). After MIR_C is lowered to LIR, the rest of the code generation remains the same as in the original the example compiler, including LIR optimizations, register allocation, lowering to x86, and linking.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer implemented method, comprising:
processing a source code representation of a computer program in an object-oriented language into a high-level intermediate representation; and
translating the high-level intermediate representation into a typed medium-level intermediate representation, comprising combining a name-based class name and corresponding structure-based record type into a combined class type, using an exact class name to represent objects of that class but not those of subclasses and the combined class type as an encoding of an existential type to represent objects of the class and subclasses of the class, and translating interface method invocation of an object by calling an interface method on the object when open, testing whether an object can be cast to a class, to an interface, to a class vector.

2. The method of claim 1 wherein translating the high-level intermediate representation further comprises:
translating virtual method invocation of an object, including performing type checking, by opening the object, providing a new type variable for the object's dynamic type, obtaining a virtual table for the object, fetching a method out of the virtual table, and calling the method on the opened object.

3. The method of claim 1 wherein translating the interface method invocation on the object further comprises:
opening the object, providing a new type variable for the object's dynamic type, getting a tag of the interface, searching for a method table for the interface in the object, fetching the interface method from the method table, and calling the method on the opened object, wherein translating the interface method invocation includes performing type checking.

4. The method of claim 1 wherein translating the high-level intermediate representation further comprises:
translating object type casting, including performing type checking, wherein types include virtual table types, type variables, runtime types, or existential types, or any combination thereof.

5. The method of claim 4 wherein translating object type casting comprises:
testing if an object can be cast to a class, including opening the object, and searching a tag chain of the object for a tag of the class.

6. The method of claim 4 wherein translating object type casting comprises:
testing if an object can be cast to an interface, including opening the object, and searching an interface table of the object for the interface.

7. The method of claim 4 wherein translating object type casting comprises:
testing if an object can be cast to a class vector, including fetching a tag of the element type of the object and testing whether the element type of the object is a subclass of the element type of the vector type.

8. The method of claim 1, further comprising:
translating the typed medium-level intermediate representation into a low-level intermediate representation, including choosing a data representation for types in the typed medium-level intermediate representation.

9. The method of claim 1, further comprising:
translating the typed medium-level intermediate representation into a low-level intermediate representation, including converting operators in the typed medium-level intermediate representation into instructions in the low-level representation.

10. The method of claim 9, wherein converting the operators comprises:
converting an open operator to a move instruction, converting a pack operator to a move instruction, or converting a tag comparison to compare and jump instructions, or any combination thereof.

11. A system implemented in an optimizing compiler, the system comprising:
a compiler component, implemented at least in part on at least one processing unit, that generates a typed medium-level intermediate representation from a source code representation of a computer program, in which the source code representation comprises definitions of one or more classes; and wherein at least some of the classes correspond to objects of the typed medium-level intermediate representation that are translated by the compiler component for:
a) virtual method invocation using an exact class name to represent objects of that class but not those of subclasses and a combined class type as an encoding of an existential type to represent objects of the class and the subclass of the class, wherein the combined class type is a combination of a name-based class name and corresponding structure-based record type;
b) interface method invocation of an interface method on an object by opening the object to obtain a method table for the interface, calling the interface method on the object when open, and testing whether an object can be cast to a class, to an interface, to a class vector;
c) object type casting, including testing whether an object can be cast to a class, whether an object can be cast to an interface, or whether an object can be cast to a class vector, or any combination thereof; and
d) vector store check, including fetching a tag of an element type of an object and testing whether the element type of the object is a subclass of the element type of the vector type.

12. The system of claim 11, wherein the compiler component further translates the typed medium-level intermediate representation into a low-level intermediate representation, including by choosing a data representation for types in the typed medium-level intermediate representation.

13. The system of claim 11 wherein types include virtual table types, type variables, runtime types, or existential types, or any combination thereof.

14. The system of claim 11 wherein the compiler component further translates the typed medium-level intermediate representation into a low-level intermediate representation, including by converting operators in the typed medium-level intermediate representation into instructions in the low-level representation.

15. The system of claim 14 wherein the compiler component converts the operators including by converting an open operator to a move instruction, converting a pack operator to a move instruction, or converting a tag comparison to compare and jump instructions, or any combination thereof.

16. A computer implemented method implemented at least in part on at least one processing unit, comprising:
modifying compiler code to generate a typed medium-level intermediate representation that includes type checking at the typed medium-level intermediate representation, including by providing a class type that represents an object's name-based class name and corresponding structure-based record type, translating virtual method invocation on at least some objects by using an exact class name to represent object of that class but not those of subclasses and a combined class type as an encoding of an existential type to represent objects of the class and subclasses of the class, translating interface method invocation of an object by calling the method on the object when open, testing whether an object can be cast to a class, to an interface, to a class vector, or any combination thereof, and performing a vector store check that determines whether an element type of the object is a subclass of the element type of a vector type.

17. The method of claim 16 wherein type checking includes determining a type of an operand, matching with a type of an operator corresponding to that operand, and matching with a type of a destination corresponding to that operator and operand.

18. The method of claim 17 wherein type checking is performed on the typed medium-level intermediate representation that does not have scopes by determining the scope of type variables, replacing the type variable in the typed medium-level intermediate representation with a new type variable whenever type checking an open instruction.

19. The method of claim 18 wherein type checking determines whether the new type variable is used only in scope of instructions that the open instruction dominates.

20. The method of claim 16 wherein the compiler code is further modified to generate a low-level intermediate representation from the typed medium-level intermediate representation, including by choosing data representations for medium level types, and converting operators in the typed medium-level intermediate representation into instructions in the low-level intermediate representation.

* * * * *